INVENTOR
Seymour Okwit
BY
Darcie Edmonds Morton Barrows & Taylor
ATTORNEYS

INVENTOR
Seymour Okwit
BY
Pennie Edmonds Morton Barrows Taylor
ATTORNEYS

United States Patent Office 3,113,278
Patented Dec. 3, 1963

3,113,278

MICROWAVE POWER LIMITER UTILIZING DETUNING ACTION OF GYROMAGNETIC MATERIAL AT HIGH R-F POWER LEVEL

Seymour Okwit, Plainview, N.Y., assignor to Cutler-Hammer, Inc., Milwaukee, Wis., a corporation of Delaware Filed May 4, 1961, Ser. No. 107,772
9 Claims. (Cl. 333—24.2)

This invention relates to microwave power limiters, and particularly limiters utilizing ferrites.

Satisfactory microwave limiters can be used for many purposes, such as the protection of receivers from damage due to excessive power levels, as amplitude limiters in frequency-modulation systems, as levelers for backward wave oscillators, etc. Also, they may be useful to limit the power of a strong signal which interferes with the reception or utilizing of signals of different frequency.

A satisfactory limiter should in general have a low insertion loss at power levels below the region in which limiting occurs. Also, for many applications it is desirable for the limiting action to set in at a very low power level.

The present invention is directed to a microwave power limiter which utilizes the non-linear power characteristics of ferrites to shift the resonant frequency of a microwave resonator for R-F power levels above and below a critical or "threshold" level. The resonator may take many forms, such as a coaxial line, waveguide or cavity resonator, and may be used in a circuit configuration yielding an overall band pass or band elimination characteristic above or below the limiting level as desired.

Ferrites are now well known, and their properties at microwave and other frequencies have been extensively explored both theoretically and experimentally. The term "ferrite" was initially applied to ferromagnetic materials having the formula $MO \cdot Fe_2\theta_3$, where M represents a bivalent metal, and usually having a cubic spinel crystal structure. However, at the present time the term is applied more broadly by many workers in the field, and includes other materials having similar magnetic properties. Among these are rare earth garnets having a garnet rather than a spinel crystal structure, such as yttrium-iron-garnet (often referred to as "YIG").

In the present application the term "ferrite" will be used in its broader sense.

At microwave frequencies, and in the presence of a steady or D.-C. magnetic field (H) of suitable direction, ferrites exhibit gyromagnetic phenomena due to the spin behavior of the elementary magnetic dipoles thereof. In general, when a D.-C. magnetic field is applied and the alternating magnetic field has a component perpendicular thereto, the spins precess at a frequency depending upon the D.-C. field strength. When the alternating frequency is equal to the precessing frequency, ferromagnetic resonance occurs and the alternating frequency energy is strongly absorbed. The frequency at which this occurs is termed the ferromagnetic resonance frequency.

Ferromagnetic resonance is commonly described by plotting the relative permeability or susceptibility of the ferrite as a function of the D.-C. magnetic field or the R-F frequency. Thus if permeability is plotted as a function of H, for a fixed R-F input frequency, a peak is observed in the region of ferromagnetic resonance.

The effective permeability is a complex quantity and has a component producing losses, as mentioned above, and also a component producing a reactance effect. In general, at low R-F power levels the ferrite behaves as a linear circuit element. However, when the R-F power level exceeds a critical value, the permeability in the resonance region changes markedly. Also, an absorption peak commonly occurs at a lower value of H in what is called a subsidiary resonance region.

In accordance with the present invention a microwave resonator is employed, and a body of ferrite material is positioned in a relatively high R-F magnetic field region thereof. A D.-C. magnetic field is applied to the ferrite having a strength corresponding to a resonance peak in the ferrite near the resonator frequency, but displaced therefrom to provide a reactance component which shifts the resonant frequency of the resonator. The reactance component contributed by the ferrite will be different above and below the critical power level mentioned above, and therefore the resultant resonant frequency of the resonator will be different. Accordingly the attenuation of a signal will be different above and below the critical power level, and limiting will occur.

Advantageously operation is in the region of the main ferromagnetic resonance frequency, and the reactance component contributed by the ferrite shifts the resonant frequency of the resonator at powers below the critical level. With the operating frequency at or near the shifted resonant frequency, a signal supplied to the resonator will be fed to the output thereof with a relatively small attenuation. Then, when the signal power increases and causes the R-F power level in the ferrite to exceed the critical level, the resonant frequency of the resonator changes toward its unshifted frequency, thereby increasing the attenuation of the signal.

The invention will be further described in connection with specific embodiments thereof.

Figures 1, 2, 3, 4:
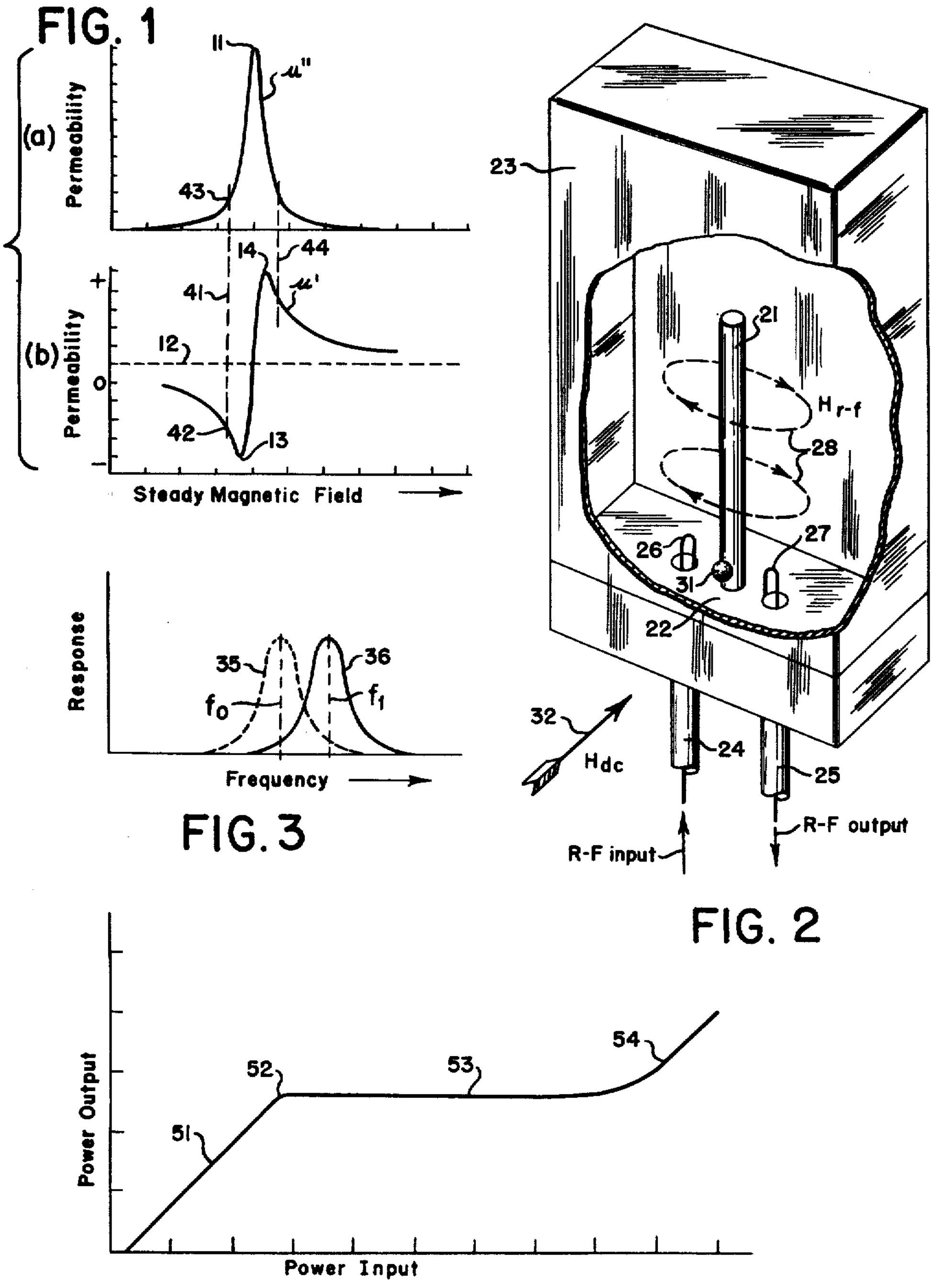
FIG. 1 shows explanatory ferrite permeability curves.
FIG. 2 shows a quarter-wave resonator limiter in accordance with the invention.
FIG. 3 shows shifted and unshifted resonance characteristics of the arrangement of FIG. 2.
FIG. 4 illustrates the resultant limiting characteristics.

Referring to FIG. 1, the curves shown at (*a*) and (*b*) show the imaginary part $\mu''$ and the real part $\mu'$ of the diagonal component of the permeability tensor for a constant R-F frequency, at relatively low power levels. The permeability tensor may be written as:

$$\begin{bmatrix} \mu & -jk & 0 \\ jk & \mu & 0 \\ 0 & 0 & 1 \end{bmatrix} \qquad (1)$$

where $\mu$ is the diagonal component, $k$ is the off-diagonal component, and $j$ is the operator $\sqrt{-1}$. This tensor is well known to those in the art.

The diagonal component $\mu$ is a complex quantity and may be represented as:

$$\mu = \mu' - j\mu'' \qquad (2)$$

When introduced into the wave propagation equations, the permeability is multiplied by $j\omega$. Accordingly the real part $\mu'$ produces a reactive effect and may be termed the reactive component. The imaginary part $\mu''$ introduces dissipation or loss.

At (*a*) of FIG. 1 it will be seen that the imaginary component, and hence the loss, is small at low values of the steady or D.-C. magnetic field and rises to a peak at 11, thereafter decreasing and returning to a relatively low value. Peak 11 is the main ferromagnetic resonance peak, and the strength of the magnetic field at which it will occur will depend upon the R-F frequency, as mentioned above.

At (*b*) of FIG. 1 it will be seen that the real component $\mu'$ is negative at low magnetic fields and becomes positive at approximately the value of the D.-C. field corresponding to ferromagnetic resonance. The dotted line 12 represents a permeability of +1, which is that of free space. The negative and positive peaks 13 and 14 correspond approximately to half amplitude (or −3 db) points of the curve in (*a*).

Referring now to FIG. 2, a quarter-wave resonator is shown comprising a central conductor 21 affixed to a ground plate 22 and surrounded by a metal box 23. Signal energy is supplied to the resonator through coaxial line 24 and removed therefrom through coaxial line 25. The inner ends of the coaxial lines couple with the R-F field of element 21 through coupling loops 26 and 27. The resonator will resonate at a frequency corresponding to approximately a quarter-wavelength of rod 21, as is well known in the art. The R-F magnetic field extends around rod 21, as indicated by dash lines 28. These will in general be somewhat elliptical for the rectangular shape of enclosure 23 shown. The R-F magnetic field will be a maximum at the grounded end of rod 21, where the R-F current is a maximum, and will decrease toward the upper free end thereof.

A small body of ferric 31 is positioned adjacent rod 21 and near the grounded end thereof so as to be in a relatively high R-F magnetic field region. A steady D.-C. magnetic field is applied to the ferrite body, as shown by arrow 32. This field may be produced by a permanent magnet or electromagnet, as desired. Such structures are well known, and are omitted in the figure to avoid confusion.

Preferably the D.-C. magnetic field should be perpendicular to the R-F magnetic field in the ferrite body, and it will be observed in FIG. 2 that this relationship obtains. However, some departure from this relationship may be possible in a particular application, although in general there will be some decrease in effectiveness.

The ferrite body 31 is shown as a sphere. However, other shapes may be employed if desired.

FIG. 3 is explanatory of the operation of the resonator of FIG. 2. Here the dotted curve 35 represents the resonance characteristic of the resonator 21 without the permeability resonance effects of the ferrite body 31. This resonant frequency is indicated as $f_0$. The sharpness of the characteristic will depend on the quality factor (Q) of the resonator, and usually a high Q is desirable.

The D.-C. magnetic field strength 32 is selected with respect to the resonator frequency $f_0$ so as to be somewhat less or greater than that required for ferromagnetic resonance, thereby introducing a reactive permeability component. This shifts the resonant frequency of the resonator and produces a resultant resonance characteristic such as shown at 36, having a shifted resonant frequency $f_1$. This with an operating frequency at or near $f_1$, signals of low power level will be passed with a minimum of loss.

Referring back to FIG. 1, it will be noted that the D.-C. magnetic field may be adjusted with respect to the operating frequency so as to be somewhat above or below the field required for ferromagnetic resonance. For example, the adjustment may cause the operating point to be as indicated by the dash line 41. Here, the intersection 42 with the $\mu'$ curve indicates that a considerable reactive effect can be obtained, while the intersection 43 with the curve of $\mu''$ indicates that only a small amount of loss will be introduced by the ferrite. The same is true for an operating point indicated by dash line 44. The frequency shift will be in opposite directions for these two operating points.

By suitably adjusting the magnetic field, an operating point may be obtained which will produce a resonant frequency shift as illustrated in FIG. 3 without introducing excessive ferrite losses. Usually operating points at or outside the peaks 13, 14 of the $\mu^1$ curve will be preferable since the ferrite loss can be reduced while still obtaining a substantial reactance effect. However, the characteristics of the particular ferrite employed will influence the choice in a particular application.

Returning to FIG. 3, the resonant characteristic 36 will be obtained at low R-F power levels where the curves of FIG. 1 apply. However, as the signal level increases, the power level in the ferrite body 31 will increase until a critical level is reached wherein the ferrite becomes nonlinear, that is, the permeability begins to change. This nonlinearity is believed to be due to parametric excitation of spin waves and the coupling thereof to the uniform precession of the magnetic dipoles. It has been observed by workers in the art, and has been explored both theoretically and experimentally. In general, as the R-F power increases beyond a rather sharply defined threshold value, the main resonance line weakens and broadens steadily.

Accordingly, as the R-F power increases beyond the threshold, peak 11 in FIG. 1 will decrease in amplitude and broaden, and peaks 13 and 14 will decrease in amplitude and their horizontal separation will increase. Thus the reactive component of the ferrite body 31 will diminish, and accordingly the effect of the ferrite on the resonant frequency of the resonator will diminish.

This will result in shifting the effective resonance characteristic from the position shown at 36 toward the position shown at 35, and a signal frequency at or near $f_1$ will begin to fall on the side of the resonant characteristic, with resultant attenuation. The process will continue as the input signal level rises until a point is reached at which the attenuation produced by the shift in resonance frequency fails to compensate for the increased power level, or signal energy begins to leak through the resonator. However, for a considerable range of power levels the limiting is quite effective.

FIG. 4 illustrates the general type of limiting characteristic obtained. At low power levels the power output is proportional to power input, indicated by the sloping line 51. The power output will be slightly less than the power input due to losses in the resonator, including those contributed by the ferrite. At a point 52 where the power level in the ferrite body 31 goes above the threshold level, the power output flattens off and is limited as shown by the horizontal line 53. Eventually, when the input power becomes so large that the limiting action is no longer effective, the power output will increase as shown at 54. However, for a considerable variation in power level, effective limiting occurs. This range is often called the dynamic range of the limiter, and in one embodiment a dynamic range in excess of 20 db was obtained.

It will be understood that the exact shape of the limiting characteristic will depend on the detailed design of the limiter, and that considerable variations from that shown in FIG. 4 are possible. For example, the horizontal portion 53 may be somewhat concave or convex.

It is desirable to select a ferrite body 31 which is low loss, so as to minimize the insertion loss of the resonator. This is further facilitated by using a high Q resonator structure. The sharpness of the resonant characteristic varies with the Q, and may be correlated with the frequency shift produced by the ferrite so as to obtain the desired signal attenuation as the shaft takes place.

In many applications it is desirable for the limiting to start at a relatively low R-F power level. For certain combinations of signal frequency, ferrite geometry and saturation magnetization, the range of D.-C. magnetic field in which subsidiary resonance can occur extends through the main resonance, as is known in the art. The coincidence of subsidiary and main resonances is a condition particularly favorable to low-level limiting. For this condition the threshold level at which non-linearity sets in is proportional to the resonance line width of the ferrite and inversely proportional to its saturation magnetization. A single crystal of YIG has been found particularly suitable for low-power limiting.

It is also known that the frequency range over which the described non-linear effects occur depends upon the ferrite and its shape. These factors may be correlated to give the desired limiting in a particular application.

By moving the ferrite body 31 laterally away from the rod 21, or by moving it somewhat toward the free end thereof, the strength of the R-F magnetic field therein may be reduced, and consequently the input lower level at which the ferrite characteristic will become non-linear will increase. Thus the power level at which limiting begins may be increased.

As an example for purposes of illustration only, a low-power level limiter constructed as shown in FIG. 2, with a single-crystal YIG sphere having a diameter of 0.040 inch and a magnetic resonance line-width of approximately 1 oersted, was found to have the following characteristics:

| | |
|---|---|
| Center frequency | 2590 megacycles. |
| Insertion loss (low level) | 2 db. |
| Threshold power | −20 dbm (10 microwatts). |
| Dynamic range | 20 db. |

These characteristics can be improved with care in design to reduce losses, particularly in the resonator.

The invention may be employed with a wide variety of types of microwave resonators. In general, the ferrite body should be positioned in a relatively high R-F magnetic field region thereof.

Figure 5:
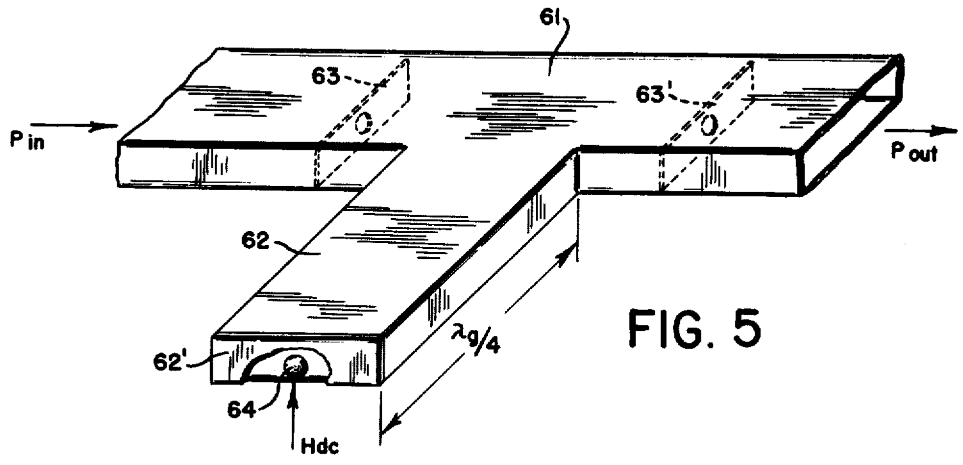
FIG. 5 shows an application of the invention to a quarter-wave waveguide resonator.

FIG. 5 illustrates an application to a quarter-wave waveguide resonator. Here, input signal energy is fed into one end of a waveguide 61 and removed from the other end thereof. A resonator 62 is connected in shunt to waveguide 61 on one of its H-plane sides. The length of resonator 62 is a quarter-wavelength in the guide, as indicated. The outer end 62′ is closed, and consequently the inner end represents substantially an open circuit at the resonant frequency of the resonator 62. Coupling irises 63 and 63′ are employed in order to provide suitable coefficients for coupling energy into and out of the resonator 62. The design and use of such coupling irises are well known in the art and need not be explained.

A ferrite body 64 is located at or near the short-circuited end 62′ of the resonator, so as to be in a high R-F magnetic field thereof. A D.-C. magnetic field, denoted $H_{dc}$, is applied substantially perpendicularly to the R-F magnetic field in the ferrite. Accordingly, as explained in connection with FIGS. 1 and 3, at lower power levels the ferrite 64 will introduce a reactive component which will shift the normal resonant frequency of the resonator 62. Thus, frequencies within the bandwidth of the shifted resonant characteristic will encounter a substantially open circuit where resonator 62 joins waveguide 61, and will be relatively unaffected.

However, when the power level of the signal exceeds the threshold in the ferrite body 64, the resonant frequency of resonator 62 will change and the signal will be attenuated. Accordingly, the overall function of the arrangement to FIG. 5 is to serve as a bandpass filter wherein a signal within the effective low power bandpass is power-limited.

Figure 6:
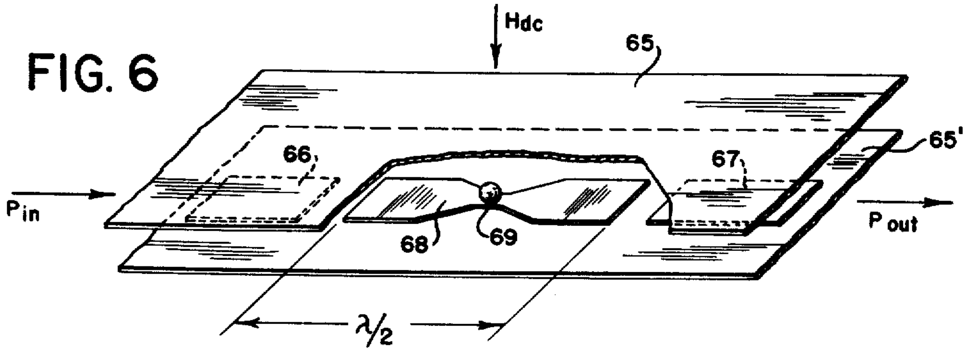
FIG. 6 shows an application to a half-wave strip transmission line resonator.

FIG. 6 illustrates an application to a strip transmission line. Here a central conductor is positioned midway between a pair of ground planes 65, 65′. Sections 66 and 67 of the central conductor serve as input and output sections. Between these sections is disposed a halfwave element 68. The current and R-F magnetic field are at a maximum near the center of the half-wave element and a ferrite body 69 is positioned in this region. The center portion of resonator 68 may be made narrower, as shown, so as to concentrate the current and give a larger effective R-F magnetic field in the ferrite body 69.

The ferrite body 69 will shift the resonant frequency of resonator 68 at low power levels, as explained in connection with FIGS. 1 and 3, and a signal within the bandpass of the shifted resonant characteristic will be transmitted from input section 66 to output section 67 with relatively small attenuation. However, when the signal power level exceeds the critical value in the ferrite body 69, the resonant frequency of resonator 68 will change and limiting will set in.

Figure 7:
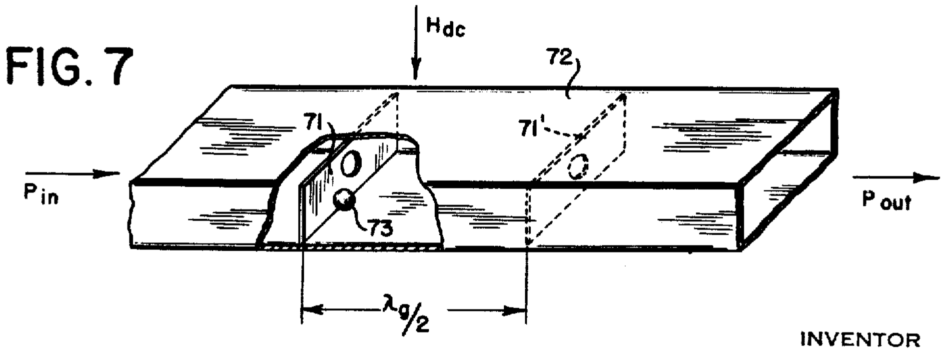
FIG. 7 shows an application to a half-wave wave-guide resonator.

FIG. 7 illustrates a further embodiment wherein irises 71 and 71′ are positioned in waveguide section 72 with approximately a half-wave spacing in the waveguide, as indicated. In this configuration, a region of relatively high R-F magnetic field exists near the irises, as is well known. The ferrite body 73 is positioned in this region and a D.-C. magnetic field applied as indicated. A shift in resonant frequency between low power and high power signal levels will take place, as described hereinbefore.

In the specific embodiments described, operation is in the region of the main ferromagnetic resonance, and for low level limiting advantageously the subsidiary resonance region coincides with the main resonance. However, as is known in the art, for a given R-F frequency, and at a power level above the threshold, the subsidiary resonance peak can be caused to occur at a D.-C. magnetic field strength considerably below that required for the main resonance. Correspondingly, if the D.-C. field is held constant and the R-F frequency varied, the subsidiary resonance peak will occur at a higher frequency than that of the main resonance.

The permeability at the subsidiary resonance peak is complex and the variations are similar to those of (*a*) and (*b*) in FIG. 1. However, in general the peak in $\mu''$ will be of smaller amplitude and broader, and the peaks in $\mu'$ will be of smaller amplitude and more widely separated.

Although it is preferred to operate in the region of main resonance, in some applications it may be desired to operate in the region of subsidiary resonance. Such operation can be obtained by selecting the magnetic field with respect to the resonator frequency so that the operating point is near the subsidiary resonance peak, but differing therefrom to obtain a reactive component when the peak is present. Inasmuch as the subsidiary resonance peak will not be present at low power levels, the unshifted resonance characteristic of the resonator will be effective. As the power level increases and the subsidiary resonance develops, the frequency of the resonator will be shifted. This is the opposite of the situation at main resonance, where the shift is present at low power levels. However, with a signal frequency within the bandwidth of the unshifted resonance characteristic, as the power increases and the characteristic shifts, the signal will move down on the slope of the characteristic, similar to operation at main resonance.

In the specific embodiments several types of microwave resonators have been shown. Other types are known, and the application of the invention thereto will be understood by those skilled in the art from the foregoing description. More than one limiter-resonator may be employed in a given application, and the coupling arrangements selected to meet the requirements of the application.

I claim:

1. A microwave power limiter which comprises a microwave resonator having a predetermined resonant frequency, connection means to said resonator for supplying and removing signal energy at a predetermined operating frequency, a body of ferrite material positioned in a relatively high R-F magnetic field region of said resonator, said ferrite body exhibiting a ferromagnetic resonance peak in the presence therein of an R-F magnetic field and a D.-C. magnetic field of corresponding strength which peak is substantially different for R-F field levels below and above a threshold level, and means for applying a D.-C. magnetic field to said ferrite body predetermined to be near the field strength corresponding to said ferromagnetic resonance peak at the resonant frequency of said resonator but differing therefrom to provide a reactive component shifting the resonant frequency of the resonator by substantially different amounts for power levels below and above a threshold level, said microwave resontaor and said ferrite body being correlated to yield an effective resonant characteristic having a peak substantially at said operating frequency at power levels below a predetermined level and shifting as the power level increases above said predetermined level to cause the operating frequency to move down on a side of the resonant characteristic and become progressively attenuated.

2. A microwave power limiter which comprises a microwave resonator having a predetermined resonant frequency, input and output connections to said resonator for supplying and removing signal energy at a predetermined operating frequnecy, a body of ferrite material positioned in a relatively high R-F magnetic field region of said resonator, said ferrite body exhibiting a ferromagnetic resonance peak in the presence therein of an R-F magnetic field and a D.-C. magnetic field of corresponding strength substantially perpendicular to a component of the R-F field, said ferrite body having absorption and reactive components in the region of said resonance peak which are substantially different for R-F field levels below and above a threshold level, and means for applying to said ferrite body a D.-C. magnetic field predetermined to be near the field strength corresponding to said ferromagnetic resonance peak at the resonant frequency of said resonator but differing therefrom to provide a reactive component shifting the resonant frequency of the resonator by substantially different amounts for power levels below and above a threshold level, said microwave resonator and said ferrite body being correlated to yield an effective resonant characteristic having a peak substantially at said operating frequency at power levels below a predetermined level and shifting as the power level increases above said predetermined level to cause the operating frequency to move down on a side of the resonant characteristic and become progressively attenuated.

3. A microwave power limiter in accordance with claim 2 in which said ferromagnetic resonance peak is the main ferromagnetic resonance peak of the ferrite body and the resonant frequency of the resonator is substantially shifted at R-F power levels below the threshold, said operating frequency being substantially equal to the shifted resonant frequency.

4. A microwave power limiter in accordance with claim 2 in which said ferromagnetic resonance peak is a subsidiary resonance peak of the ferrite body and occurs at R-F power levels above the threshold, said operating frequency being substantially equal to the unshifted resonant frequency of the resonator.

5. A microwave power limiter which comprises a microwave resonator having a predetermined resonant frequency, connection means to said resonator for supplying and removing signal energy at a predetermined operating frequency differing from said resonant frequency, a body of ferrite material positioned in a relatively high R-F magnetic field region of the resonator, said ferrite body exhibiting a substantial change from the low level permeability thereof at a ferromagnetic resonance frequency when the power level exceeds a threshold level, means for applying a D.-C. magnetic field to the ferrite body predetermined to be near the field strength producing ferromagnetic resonance at the resonant frequency of said resonator but differing therefrom to provide a reactive component substantially shifting the resonant frequency of the resonator at R-F power levels below said threshold level, said operating frequency being near the shifted resonant frequency and the said microwave resonator and ferrite body being correlated to yield an effective resonant characteristic which shifts as the power level increases above a predetermined level to cause the operating frequency to move down on a side of the resonant characteristic and become progressively attenuated.

6. A microwave power limiter which comprises a microwave resonator having a predetermined resonant frequency, input and output connections to said resonator for supplying and removing signal energy at a predetermined operating frequency differing from said resonant frequency, a body of ferrite material positioned in a relatively high R-F magnetic field region of the resonator, said ferrite body exhibiting a substantial change from the low level permeability thereof at a ferromagnetic resonance frequency when the power level exceeds a threshold level, means for applying a D.-C. magnetic field to the ferrite body substantially perpendicular to an R-F field component therein, the D.-C. field being predetermined to be near the field strength producing ferromagnetic resonance at the resonant frequency of said resonator but differing therefrom to provide a reactive component substantially shifting the resonant frequency of the resonator at R-F power levels below said threshold level, said operating frequency lying substantially within the bandwidth of the shifted resonant frequency characteristic, said microwave resonator and ferrite body being correlated to yield an effective resonant characteristic which shifts as the power level increases above a predetermined level to cause the operating frequency to move down on a side of the resonant characteristic and become progressively attenuated.

7. A microwave power limiter which comprises a microwave resonator having a predetermined resonant frequency, input and output connections to said resonator for supplying and removing signal energy at a predetermined operating frequency differing from said resonant frequency, a body of ferrite material positioned in a relatively high R-F magnetic field region of the resonator, said ferrite body exhibiting a substantial change from the low level permeability thereof at a ferromagnetic resonance frequency when the power level exceeds a threshold level, means for applying a D.-C. magnetic field to the ferrite body substantially perpendicular to an R-F field component therein, the D.-C. field being predetermined to be near the field strength producing ferromagnetic resonance at the resonant frequency of said resonator but differing therefrom to provide a reactive component substantially shifting the resonant frequency of the resonator at R-F power levels below said threshold level, said operating frequency being near said shifted resonant frequency, said shifting and the unshifted resonant frequency of the resonator being predetermined to yield a resonant characteristic effective between said input and output connections to increase the attenuation of signals at said operating frequency having input powers above said threshold level.

8. A microwave power limiter in accordance with claim 7 in which the ferrite body and the operating frequency are predetermined to cause the subsidiary resonance region to substantially coincide with the main resonance region of the ferrite.

9. A microwave power limiter in accordance with claim 7 in which the ferrite body is a single crystal sphere of yttrium-iron-garnet.

References Cited in the file of this patent

UNITED STATES PATENTS 2,755,447 Engelmann ------------ July 17, 1956

OTHER REFERENCES

Nelson: Ferrite-Tunable Cavities, Proceedings of the IRE, October 1956, pages 1449–1455 relied upon.

Beljers: Measurements, Philips Research Laboratories, February 1949, pages 629–641 relied upon.

Dillon: Ferromagnetic Res. Physical Review, Jan. 15, 1957, pages 759 and 760 relied upon.

UNITED STATES PATENT OFFICE

CERTIFICATE OF CORRECTION

Patent No. 3,113,278 December 3, 1963

Seymour Okwit

It is hereby certified that error appears in the above numbered patent requiring correction and that the said Letters Patent should read as corrected below.

Column 3, line 25, for "ferric" read -- ferrite --; line 55, for "This" read -- Thus --; column 4, line 63, for "shaft" read -- shift --; column 5, line 8, for "lower" read -- power --.

Signed and sealed this 2nd day of June 1964.

(SEAL)
Attest:

ERNEST W. SWIDER
Attesting Officer

EDWARD J. BRENNER
Commissioner of Patents